(12) United States Patent
Alghooneh et al.

(10) Patent No.: US 10,696,108 B1
(45) Date of Patent: Jun. 30, 2020

(54) TIRE LEAK DETECTION AND NOTIFICATION SYSTEM

(71) Applicant: GM GLOBAL TECHNOLOGY OPERATIONS LLC, Detroit, MI (US)

(72) Inventors: Mansoor Alghooneh, North York (CA); Joseph K. Moore, Whitby (CA); Anushya Viraliur Ponnuswami, Maple (CA); Amin Abdossalami, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/380,297

(22) Filed: Apr. 10, 2019

(51) Int. Cl.
*B60C 23/04* (2006.01)

(52) U.S. Cl.
CPC ...... *B60C 23/0479* (2013.01); *B60C 23/0401* (2013.01); *B60C 23/0476* (2013.01)

(58) Field of Classification Search
CPC ............ B60C 23/0479; B60C 23/0401; B60C 23/0476
USPC ........................................................ 340/442
See application file for complete search history.

(56) References Cited

U.S. PATENT DOCUMENTS

| 7,181,366 | B2 | 2/2007 | Rimkus et al. | |
|---|---|---|---|---|
| 2002/0044051 | A1* | 4/2002 | Sugisawa | B60C 23/00 340/442 |
| 2012/0296515 | A1* | 11/2012 | Boss | G01C 21/3453 701/32.3 |
| 2014/0316645 | A1* | 10/2014 | Norman Rose | G01L 1/146 701/34.4 |
| 2017/0217261 | A1* | 8/2017 | Mays | B60C 23/0479 |
| 2019/0084360 | A1* | 3/2019 | Tsujita | B60C 23/04 |

* cited by examiner

*Primary Examiner* — Joseph H Feild
*Assistant Examiner* — Sharmin Akhter
(74) *Attorney, Agent, or Firm* — Cantor Colburn LLP

(57) ABSTRACT

Embodiments include methods, systems and computer readable storage medium for a method for detection and notification of a tire leak is disclosed. The method includes receiving, by a tire leak detection system, sensor data from one or more tires. The method further includes determining, by the tire leak detection system, an occurrence of a leak anomaly in at least one of the one or more tires based on the sensor data. The method further includes predicting, by the tire leak detection system, a time and/or distance the at least one of the one or more tires will function ineffectively. The method further includes outputting, by the tire leak detection system, a code to a user or server indicating a leak type associated with the leak anomaly.

20 Claims, 5 Drawing Sheets

TIRE LEAK DETECTION AND NOTIFICATION SYSTEM

INTRODUCTION

The subject disclosure relates generally to tire leak detection and more particularly to determining a tire leak and notifying a user of the tire leak.

A vehicle, such as a car, motorcycle, or any other type of automobile or a non-motorized transport may be equipped with tires to enable the vehicle or non-motorized transport to be mobile. Tires are frequently filled with gas. If the tire is penetrated by a foreign object or the integrity of the tire/wheel system is otherwise compromised, the gas can escape the tire, causing the tire to deflate. In the case of a slower leak, notification of the leak provides convenience for the customer to schedule a repair, while in the case of a faster leak, the safety of the vehicle or non-motorized transport can also be compromised.

Accordingly, it is be desirable to provide further improvements for tire leak detection.

SUMMARY

In one exemplary embodiment, a method for detection and notification of a tire leak is disclosed. The method includes receiving, by a tire leak detection system, sensor data from one or more tires. The method further includes determining, by the tire leak detection system, an occurrence of a leak anomaly in at least one of the one or more tires based on the sensor data. The method further includes predicting, by the tire leak detection system, a time and/or distance the at least one of the one or more tires will function ineffectively. The method further includes outputting, by the tire leak detection system, a code to a user or server indicating a leak type associated with the leak anomaly.

In addition to one or more of the features described herein, one or more aspects of the described method further includes predicting the time and/or distance the at least one of the one or more tires will become unusable using at least three prediction models. Another aspect of the method is that the determination of the leak anomaly is based on tire volume variations, tire temperature changes and tire pressure changes associated with each of the one or more tires. Another aspect of the method is that the leak type is associated with one of: a slow leak, a fast leak or no leak. Another aspect of the method is that the predicted time and/or distance the at least one of the one or more tires will become unusable is output in response to the leak type being a slow leak. Another aspect of the method is that a notification to pull over as soon as possible is output in response to the leak type being a fast leak. Another aspect of the method is that a notification is output indicating that a leak is no longer detected in response to the leak type being a no leak.

In another exemplary embodiment, a system for detection and notification of a tire leak is disclosed herein. The system includes one or more tires, a memory, a processor coupled to the memory and a tire leak detection system. The tire leak detection system is operable to receive sensor data from the one or more tires. The tire leak detection system is further operable to determine an occurrence of a leak anomaly in at least one of the one or more tires based on the sensor data. The tire leak detection system is further operable to predict a time and/or distance the at least one of the one or more tires will function ineffectively. The tire leak detection system is further operable to output a code to a user or server indicating a leak type associated with the leak anomaly.

In yet another exemplary embodiment a computer readable storage medium for performing a method for detection and notification of a tire leak is disclosed herein. The computer readable storage medium includes receiving sensor data from one or more tires. The computer readable storage medium further includes determining an occurrence of a leak anomaly in at least one of the one or more tires based on the sensor data. The computer readable storage medium further includes predicting a time and/or distance the at least one of the one or more tires will function ineffectively. The computer readable storage medium further includes outputting a code to a user or server indicating a leak type associated with the leak anomaly.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
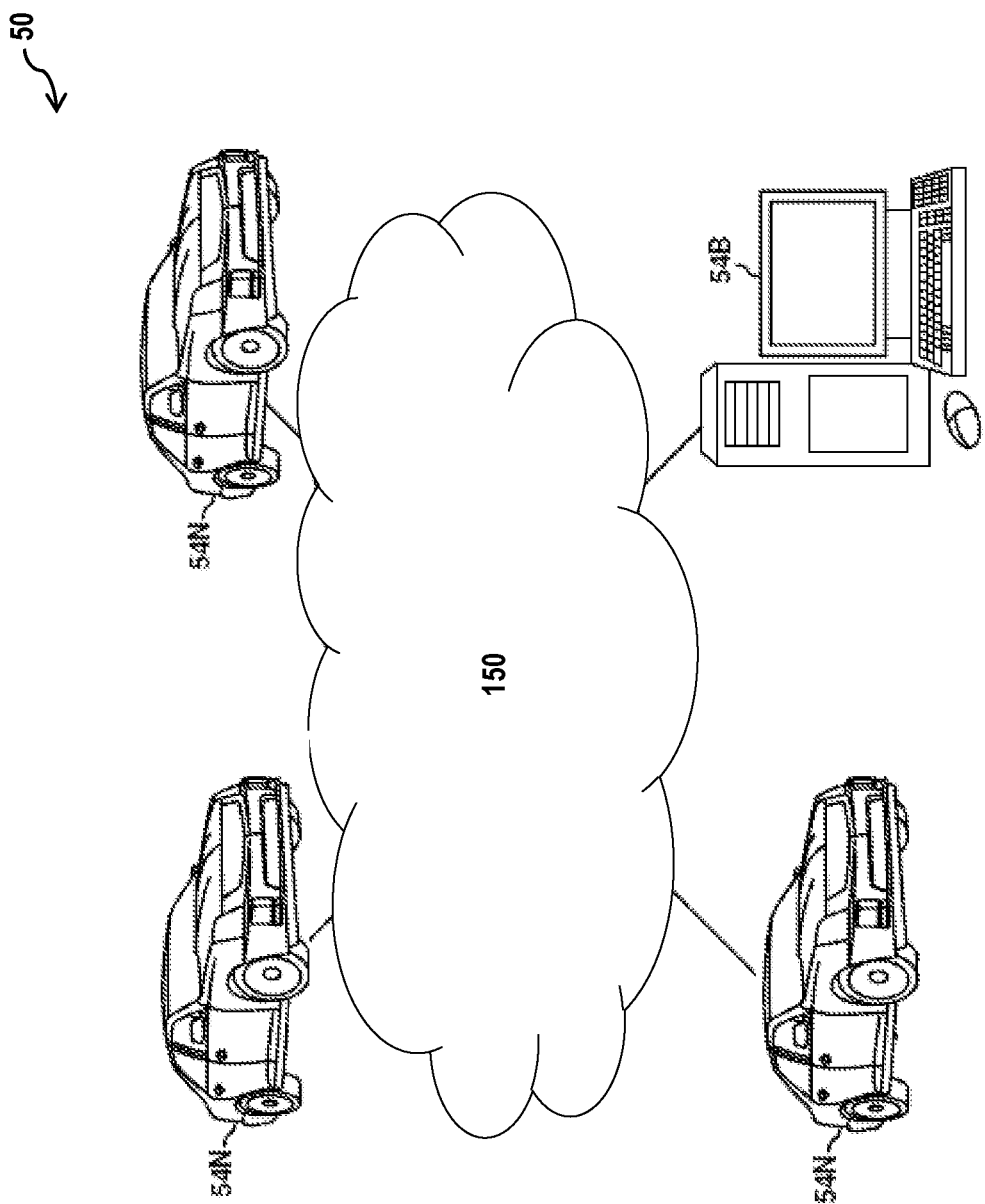
FIG. 1 is a computing environment according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 illustrates a computing environment 50 associated with a system for tire pressure monitoring by a vehicle according to one or more embodiments. As shown, the computing environment 50 comprises one or more computing devices, for example, a server/cloud 54B, and/or a vehicle onboard computer system 54N incorporated into each of a plurality of autonomous or non-autonomous vehicles, which are connected via network 150. The one or more computing devices can communicate with one another using network 150.

Network 150 can be, for example, a cellular network, a local area network (LAN), a wide area network (WAN), such as the Internet and WIFI, a dedicated short-range communications network (for example, V2V communication (vehicle-to-vehicle), V2X communication (i.e., vehicle-to-everything), V2I communication (vehicle-to-infrastructure), and V2P communication (vehicle-to-pedestrian)), or any combination thereof, and may include wired, wireless, fiber optic, or any other connection. Network 150 can be any combination of connections and protocols that will support communication between server/cloud 54B, and/or the plurality of vehicle onboard computer systems 54N, respectively.

When a cloud is employed instead of a server, server/cloud 54B can serve as a remote computing resource. Server/cloud 54B can be implemented as a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
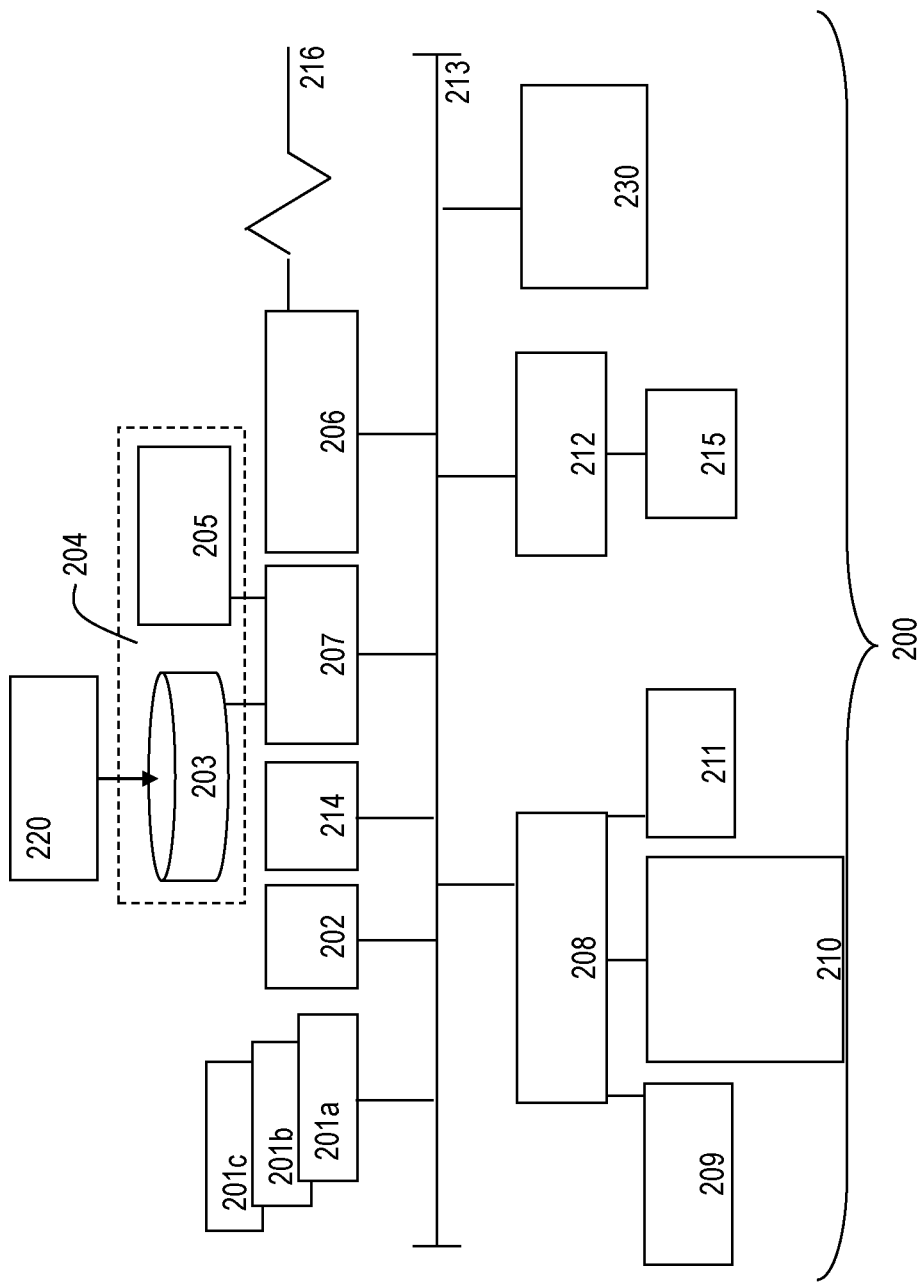
FIG. 2 is a block diagram illustrating one example of a processing system for practice of the teachings herein.

In accordance with an exemplary embodiment, FIG. 2 illustrates a processing system 200 for implementing the teachings herein. The processing system 200 can form at least a portion of the one or more computing devices, such as server/cloud 54B, and/or vehicle onboard computer system 54N. The processing system 200 may include one or more central processing units (processors) 201a, 201b, 201c, etc. (collectively or generically referred to as processor(s) 201). Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or another storage drive 205 or any other similar component. I/O adapter 207, hard disk 203, and another storage drive 205 are collectively referred to herein as mass storage 204. Operating system 220 for execution on the processing system 200 may be stored in mass storage 204. The network adapter 206 interconnects system bus 213 with an outside network 216, which can be network 150, enabling processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, network adapter 206, I/O adapter 207, and display adapter 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A microphone 209, steering wheel/dashboard controls 210, and speaker 211 can all be interconnected to system bus 213 via user interface adapter 208, which may include, for example, a Super I/O chip integrating multiple device adapters into a single integrated circuit.

The processing system 200 may additionally include a graphics-processing unit 230. The graphics-processing unit 230 is a specialized electronic circuit designed to manipulate and alter memory to accelerate the creation of images in a frame buffer intended for output to a display. In general, graphics-processing unit 230 is very efficient at manipulating computer graphics and image processing and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as microphone 209 and steering wheel/dashboard controls 210, and output capability including speaker 211 and display monitor 215. In one embodiment, a portion of system memory 214 and mass storage 204 collectively store an operating system to coordinate the functions of the various components shown in FIG. 2.

Figure 3:
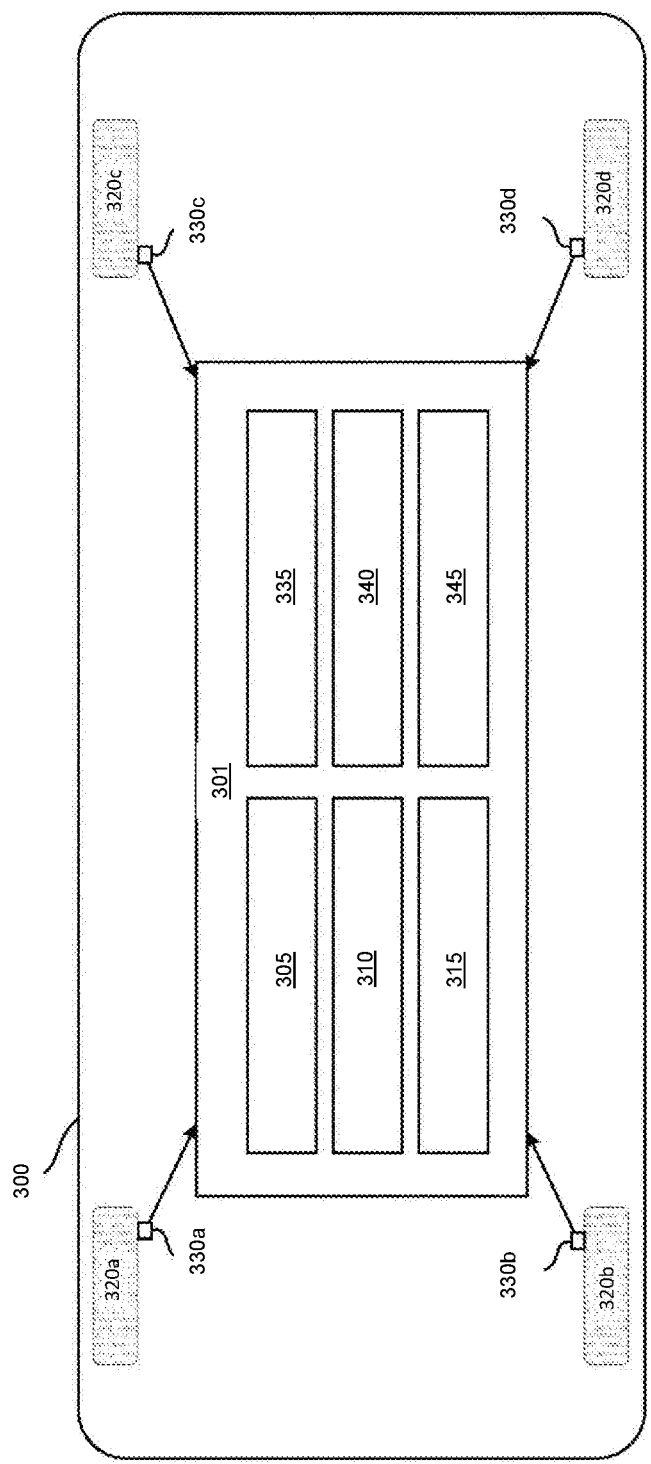
FIG. 3 depicts a schematic view of an exemplary tire leak detection system according to one or more embodiments.

FIG. 3 depicts components of a tire leak detection system 301 associated with vehicles incorporating the vehicle onboard computer system 54N according to one or more embodiments. A vehicle 300 having the vehicle onboard computer system 54N can additionally include the tire leak detection system 301 and tires 320a, 320b, 320c, 320d (collectively "tires 320"), each having a sensor 330a, 330b, 330c, 330d (collectively "sensors 330"), respectively. The sensors 330 are configured to send data (e.g., a sensor ID, temperature data, pressure data, a time difference between receipt of a current data transmission versus receipt of a previous data transmission (Δt), etc.) about each of the tires 320 to the tire leak detection system 301. A sensor 330 can be a smart sensor that includes a processor and a memory so that pressure, temperature and/or Δt can be processed prior to transmitting to the tire leak detection system 301.

The tire leak detection system 301 includes a processing device 305, a memory 310, a sensor engine 315, a leak detection engine 335, a leak rate prediction engine 340, and an alert and reset engine 345. The processing system 301 receives data about the tires 320 (e.g., tire speed data), and uses the data to determine tire leak rate as described herein.

The sensor engine 315 can receive sensor data for each tire 320. The sensor data for each tire 320 can include a sensor ID, an associated tire pressure, an associated tire temperature, and an associated Δt, respectively. The temperature data, pressure data and Δt is received by the sensor engine 315 from the sensor 330a associated with tires 320. The sensors 330 can be a group or array of sensors that collect sensor data about the tires 320. For example, the sensors 330 can include temperature sensors, pressure sensors, and other suitable sensors that collect data about the tires 320.

The leak detection engine 335 can detect a tire leak based on a probabilistic anomaly-detection approach that utilizes the sensor data. The leak detection engine 335 can utilize a tire-leak detection metric to compensate for tire volume variations due to the outside temperature, friction, and all other sources that can generate heat in the tires. The tire-leak detection metric can be based on the following equation:

$$P^{**} = (P/T)T_{ref} - \beta(P)(T - T_{ref})$$

where $P^{**}$ is the tire-leak detection metric, P is tire pressure, T is tire temperature, Tref is a reference temperature and $\beta$ is a function of the tire pressure. For example, $\beta$ can be a linear function of the tire pressure in a form of:

$$\beta = a^*P + b$$

where a and b are calibratable values.

The leak detection engine 335 can create reference data using a recursive weighed distribution algorithm that assigns more weight to recently acquired sensor data than older sensor data. In an embodiment, a weighted recursive mean value including the forgetting factor can be calculated as follows:

$$\mu_n = \gamma\left[\frac{W_n - w_n}{W_n}\right]\mu_{n-1} + \frac{w_n}{W_n}\chi_n$$

where $\mu_n$ is a mean value of a sampling distribution, $\gamma$ is a forgetting factor, $X_n$ is a sample mean for the tire-leak detection metric, $w_n$ is a weight of a sample mean of the tire-leak detection metric, $W_n$ is a sum of the weights, and $\mu_{n-1}$ is a previous mean value of the sampling distribution. In an embodiment, a standard deviation of the sample distribution can be calculated as follows:

$$S_n = \gamma S_{n-1} + w_n(\chi_n - \mu_{n-1})(\chi_n - \mu_n)$$

$$E_n = \sqrt{\frac{S_n}{W_n}}$$

where $S_n$ is the standard deviation of the sampling distribution and $S_n-1$ is the standard deviation of the previous sampling distribution.

If $\mu_n-X_n \geq$ a predetermined multiple of $E_n$ (e.g., $4.7*E_n$), the leak detection engine 335 has detected a leak anomaly (i.e., a leak and/or a deviation from desired tire specifications) in tire 320a, for example. The leak detection engine 335 can also calculate a leak rate for the detected leak anomaly. The leak detection engine 335 can utilize newly acquired sensor data reflecting a current state of gas in a tire 320 to revise calculations associated with the detected leak anomaly.

The alert and reset engine 345 can perform a tire leak monitor reset in response to a tire 320 being repaired (e.g., applying a plug) or replaced. The tire monitor reset can also be performed in response to a tire 320 being inflated, replacing a sensor for tire 320a or in response to a tire rotation being performed between tires 320, for example an associated sensor ID, or if the customer performs a manual reset through the display information cluster or center stack module. In response to the leak detection engine 335 detecting a leak anomaly, the leak rate prediction engine 340 can calculate/predict a leak behavior for the leak anomaly which includes a predicted time and/or distance in which operation of a tire 320 having the leak anomaly will cause the tire to function ineffectively (i.e., the tire is deflated/flat or a tire failure could occur). Accordingly, the predicted time and/or distance is a time range or distance in which tire repairs can be performed on the tire before the tire is flat or destroyed.

The leak rate prediction engine 340 calculates the predicted time and/or distance for a tire 320 using a using a least-square error framework based on at least three prediction models (e.g., sonic, exponential, and linear). The prediction models can be applied in a recursive manner (e.g., based on a prescribed weighting based on a change in time between data transmissions).

The leak rate prediction engine 340 can utilize a plurality of prediction data bins to store sensor data samples. The prediction data bins are determined using a placard pressure and a calibration pressure (i.e., a percentage X of a posted placard pressure). A resolution for the bins can be determined based on a Y sigma where Y is a calibration value and sigma is a standard deviation of the sampling distribution, for example, each bin can have a 4-kilopascal resolution range.

Accordingly, each bin is populated by a recursive-weighted representation of all the tire leak detection samples in an associated bin along with a forgetting factor. The forgetting factor is a factor that can be used to reduce a weight for older samples thereby allowing more recent samples to have more influence when predicting the time and/or distance in which a tire 320 will become unusable.

The leak rate prediction engine 340 can apply at least the three prediction models to each of a plurality of prediction data bins. Results from each of the prediction models can be compared with each other. In one embodiment, the model that has the least residual error can be selected for use when predicting a leak behavior for a tire.

The leak rate prediction engine 340 can also adapt to tire leak behavior changes while in operation. For example, the leak rate prediction engine 340 can adjust predictions in response to a tire 320 going from a slow leak to a fast leak or vice versa. For example, a first leak rate can be calculated by the leak detection engine 335 when a nail is in a tire 320 causing a slow leak but can be revised/updated by the leak detection engine 335 to reflect a second leak rate indicating a fast leak in response to new sensor data indicating that the nail has dislodged from the tire 320. The leak detection engine 335 can also calculate a second leak rate in response to new sensor data indicating that a tire 320 has been repaired or replaced (i.e., normal/no leak).

In response to the leak detection engine 335, the alert engine and reset 345 can output an alert (e.g., visual, audible and/or haptic) indicating an occurrence of a detected leak anomaly for an associated tire 320. The alert can indicate a leak type (e.g. slow leak or fast leak), which can be color-coded (e.g., yellow for a slow leak and red for a fast leak). In addition to color-coding, the alert engine can provide driver information and/or instructions based on the leak type.

If the leak type is associated with a slow leak and the vehicle is in motion, the vehicle can provide a predicted time and/or distance in which the tire 320 will become unusable to a driver. If the leak type is associated with a slow leak and the vehicle is not in motion, the vehicle can communicate with the driver (e.g. via text) and instruct the driver to check the tire associated with the detected leak anomaly.

If the leak type is associated with a fast leak and the vehicle is in motion, the vehicle can instruct the driver to pull over to a safe location as soon as possible. If the leak type is associated with a fast leak and the vehicle is not in motion, the vehicle can communicate with the driver (e.g. via text) and instruct the driver to check the tire associated with the detected leak anomaly.

If the tire associated with the detected leak anomaly is repaired or inflated above a predetermined threshold, the alert can indicate a leak type (e.g., normal/no leak), which can be color-coded (e.g., green). If a tire does not have a detected leak anomaly, (i.e., the tire 320 is operating under normal conditions and an associated color code (green) for normal operation/no leak can be output to the driver.)

Figure 4A:
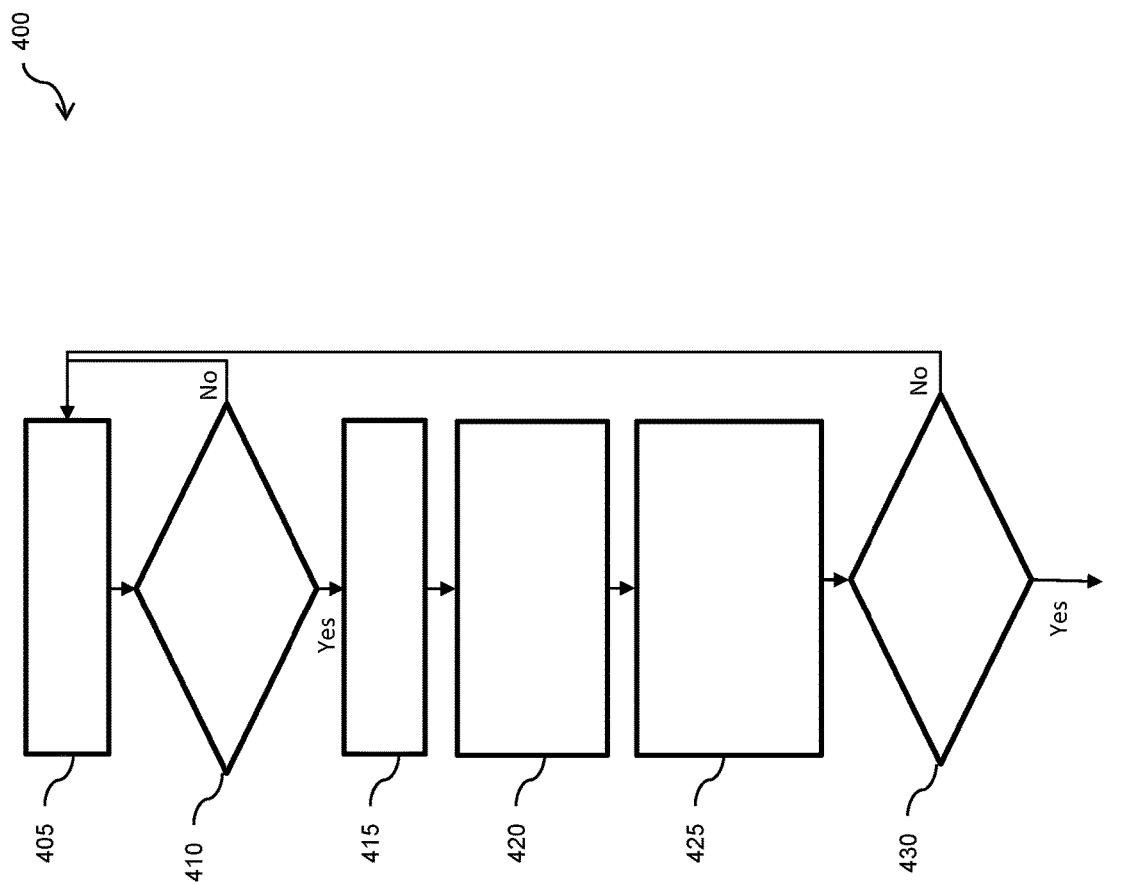
FIGS. 4A and 4B depict a flow diagram of a method for detection and notification of a tire leak.
Figure 4B:
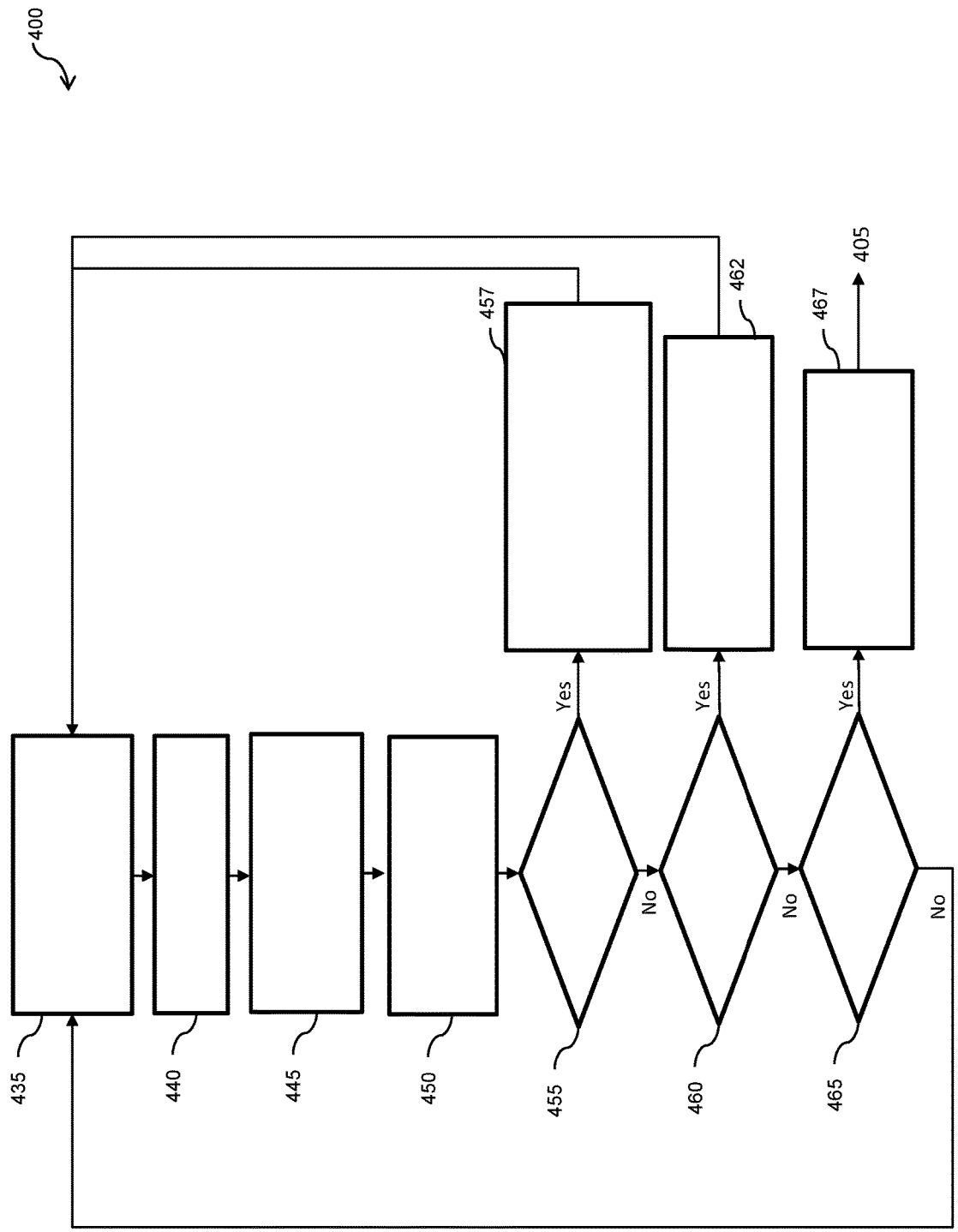

FIGS. 4A and 4B depict a flow diagram of a method 400 for detection and notification of a tire leak according to one or more embodiments. At block 405, a vehicle, (i.e., a vehicle or non-motorized transport (a trailer)) having a tire leak detection system, (e.g., tire leak detection system 301), can receive sensor data from one or more tires of the vehicle. At block 410, the tire leak detection system can determine if the received sensor data is valid and current using, for example, a validity flag. If the sensor data is not valid and current, method 400 returns to block 405.

If the sensor data is valid and current, the method 400 proceeds to block 415 where the tire leak detection system can calculate a tire-leak detection metric based one the received sensor data. At block 420, the tire leak detection system can calculate a recursive weighted average that includes a forgetting factor using the tire-leak detection metric. At block 425, the tire leak detection system can build a reference distribution based on the recursive-weighted average and forgetting factor. At block 430, the tire leak detection system can determine whether a difference between mean value of the sampling distribution and a sample mean of the tire-leak detection metric is greater than a predetermined multiple of the standard deviation of the sampling distribution.

If the difference between mean value of the sampling distribution and a sample mean of the tire-leak detection metric is not greater than the predetermined multiple of the standard deviation of the sampling distribution, the method 400 returns to block 405. If the difference between mean value of the sampling distribution and a sample mean of the tire-leak detection metric is greater than the predetermined multiple of the standard deviation of the sampling distribution, the method 400 proceeds to block 435 where the tire leak detection system determines that a leak anomaly has occurred in the one or more tires and can predict a tire leak behavior for the one or more tires using a plurality of models (e.g., three models).

At block 440, the tire leak detection system can select a model of the plurality of models having a lowest residual error. At block 445, the tire leak detection system can predict a time and/or distance the one or more tires will become unusable due to the leak anomaly. At block 450, the tire leak detection system can classify a leak associated with the leak anomaly as fast, slow or no longer detected.

At block 455, the tire leak detection system can determine if the leak is a slow leak. If the leak is a slow leak, the method 400 proceeds to block 457 where the tire leak detection system can cause the vehicle to output a code to a user or server indicating the occurrence of a slow leak and/or a predicted time and/or distance the vehicle can remain in motion before the one or more tires become unusable (i.e., flat or a tire failure). If the vehicle is stationary, the tire leak detection system can cause the vehicle to communicate with a driver by sending a message to check the one or more tires for a leak (e.g., via a text message).

If the tire leak detection system determines that the leak is not a slow leak, the method proceeds to block 460 where the tire leak detection system can determine if the leak is a fast leak. If the leak is a fast leak, the method 400 proceeds to block 462 where the tire leak detection system can cause the vehicle to output a code a user or server indicating the occurrence of a fast leak and/or an instruction to pull the vehicle over to a safe location as soon as possible. If the vehicle is stationary, the tire leak detection system can cause the vehicle to communicate with the driver by sending a message to check the one or more tires for a leak (e.g., via a text message).

If the tire leak detection system determines that the leak is not a fast leak, the method proceeds to block 465 where the tire leak detection system can determine if the leak is no longer detected. If the leak is no longer detected, the method 400 proceeds to block 467 where the tire leak detection system can cause the vehicle to output a code a user or server indicating that the leak is no longer detected. If the vehicle stationary, the tire leak detection system can cause the vehicle to communicate with the driver by sending a message that the leak is no longer detected (e.g., via a text message). The method then returns to block 405. If a leak is still detected, the method returns to block 435.

Accordingly, the embodiments disclosed herein describe a system that can detect a tire leak and predicts how much time the driver has before tire pressure reaches below an acceptable threshold. The system can communicate a leak type and lead-time to a flat tire to the driver. The system can compensate for the effect of the tire volume variation due to the outside temperature, friction, and any other heat generating sources for tires. The system predicts the lead-time to a flat tire using a least-square error framework based on a plurality of prediction models (e.g. three models such as sonic, exponential, and linear).

The system can also perform an auto reset under designed use cases such as sensor replacement, tire inflation, tire rotation, tire repair, and tire replacement. The system can also monitor a tire leak to recognize when the tire leak is no longer detected [e.g. sealant in the tire]. The applications of the tire leak detection system are extended to non-vehicle applications (e.g. trailers, aircraft landing gear, farming equipment).

Technical effects and benefits of the disclosed embodiments include, but are not limited to improving safe operation of vehicles and non-motorized transport by causing a customer to be notified about tire anomalies sooner. The present system employs an anomaly detection scheme and considers volume variations in addition to temperature and pressure changes in a tire. Leak anomaly detection of the present system is designed to be robust to noise sources, including temperature variations pressure variations and tire volume variations. Accordingly, reliability of the leak detection is improved.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for detection and notification of a tire leak, the method comprising:
   receiving, by a tire leak detection system, sensor data from one or more tires;
   determining, by the tire leak detection system, a tire-leak detection metric comprising a recursive weighted average calculation and a reference distribution based on the sensor data;
   determining, by the tire leak detection system, an occurrence of a leak anomaly in at least one of the one or more tires utilizing the tire-leak detection metric;
   predicting, by the tire leak detection system, a time and distance the at least one of the one or more tires will function ineffectively; and
   outputting, by the tire leak detection system, a code to a user or server indicating a leak type associated with the leak anomaly.

2. The method of claim 1, further comprising predicting the time and distance the at least one of the one or more tires will function ineffectively using a plurality of prediction models.

3. The method of claim 1, wherein the determination of the leak anomaly is based on tire volume variations, tire temperature changes and tire pressure changes associated with each of the one or more tires.

4. The method of claim 1, wherein the leak type is associated with one of: a slow leak, a fast leak or no leak.

5. The method of claim 4, wherein the predicted time and distance the at least one of the one or more tires will become unusable is output in response to the leak type being a slow leak.

6. The method of claim 4, wherein a notification to pull over as soon as possible is output in response to the leak type being a fast leak.

7. The method of claim 4, wherein a notification is output indicating that a leak is no longer detected in response to the leak type being a no leak.

8. A system for detection and notification of a tire leak, the system comprising:
   a vehicle or non-motorized transport; wherein the vehicle or non-motorized transport comprises:
   one or more tires;
   a memory and a processor coupled to the memory; and
   a tire leak detection system;
   wherein the tire leak detection system is operable to:
   receive sensor data from the one or more tires;
   determine a tire-leak detection metric comprising a recursive weighted average calculation and a reference distribution based on the sensor data;
   determine an occurrence of a leak anomaly in at least one of the one or more tires utilizing the tire-leak detection metric;
   predict a time and distance the at least one of the one or more tires will become unusable; and
   output a code to a user or server indicating a leak type associated with the leak anomaly.

9. The system of claim 8 further comprising predicting the time and distance the at least one of the one or more tires function ineffectively using a plurality of prediction models.

10. The system of claim 8, wherein the determination of the leak anomaly is based on tire volume variations, tire temperature changes and tire pressure changes associated with each of the one or more tires.

11. The system of claim 8, wherein the leak type is associated with one of: a slow leak, a fast leak or no leak.

12. The system of claim 11, wherein the predicted time and distance the at least one of the one or more tires will become unusable is output in response to the leak type being a slow leak.

13. The system of claim 11, wherein a notification to pull over as soon as possible is output in response to the leak type being a fast leak.

14. The system of claim 11, wherein a notification is output indicating that a leak is no longer detected in response to the leak type being a no leak.

15. A non-transitory computer readable medium having program instructions embodied therewith, the program instructions readable by a processor to cause the processor to perform a method for detection and notification of a tire leak, the method comprising:
   receiving sensor data from one or more tires;
   determining a tire-leak detection metric comprising a recursive weighted average calculation and a reference distribution based on the sensor data;
   determining an occurrence of a leak anomaly in at least one of the one or more tires utilizing the tire-leak detection metric;
   predicting a time and distance the at least one of the one or more tires will become unusable; and
   outputting a code to a user or server indicating a leak type associated with the leak anomaly.

16. The computer readable medium of claim 15 further comprising predicting the time and distance the at least one of the one or more tires will function ineffectively using a plurality of prediction models.

17. The computer readable medium of claim 15, wherein the determination of the leak anomaly is based on tire volume variations, tire temperature changes and tire pressure changes associated with each of the one or more tires.

18. The method of claim 1, wherein the tire leak detection system determines whether a difference between mean value of a sampling distribution of the sensor data and a sample mean of the tire-leak detection metric is greater than a predetermined multiple of a standard deviation of the sampling distribution.

19. The method of claim 1, wherein predicting the time and distance comprises predicting how much time a driver has before tire pressure reaches below a threshold.

20. The method of claim 19, wherein predicting the time and distance comprises predicting a lead-time to a flat tire using a least-square error framework based on a plurality of prediction models comprising at least a sonic model, exponential model, and linear model.

* * * * *